United States Patent [19]

Baginski et al.

[11] Patent Number: 5,649,422

[45] Date of Patent: Jul. 22, 1997

[54] HYDRAULIC LIFT APPARATUS FOR A BATTERY DRIVEN LIFT TRUCK

[75] Inventors: Ralf Baginski, Neetze; Hans-Peter Claussen, Norderstedt; Hans-Joachim Doss, Hamburg; Andreas Klatt, Hamburg, all of Germany

[73] Assignee: Jungheinrich Aktiengesellschaft, Hamburg, Germany

[21] Appl. No.: 378,793

[22] Filed: Jan. 26, 1995

[30] Foreign Application Priority Data

Jan. 29, 1994 [DE] Germany ............ 44 02 653.6

[51] Int. Cl.[6] .................................................. F16D 31/02
[52] U.S. Cl. ......................................... 60/431; 60/477
[58] Field of Search .................... 60/420, 422, 423, 60/427, 484, 477, 431, 414; 187/275, 290, 285

[56] References Cited

U.S. PATENT DOCUMENTS

| 3,947,744 | 3/1976 | Grace et al. | 320/61 |
|---|---|---|---|
| 4,351,415 | 9/1982 | Kita | 187/285 |
| 4,503,940 | 3/1985 | Watanabe | 187/290 |
| 4,548,296 | 10/1985 | Hasegawa | 187/275 |
| 4,548,299 | 10/1985 | Nomura | 187/290 |
| 4,666,020 | 5/1987 | Watanabe | 187/290 |
| 4,690,606 | 9/1987 | Ross | 320/14 X |
| 4,723,107 | 2/1988 | Schmid | 322/35 |
| 5,014,823 | 5/1991 | Pelto-Huikko | 187/275 |
| 5,131,507 | 7/1992 | Watanabe | 187/285 |
| 5,349,142 | 9/1994 | Hasegawa | 187/285 X |

FOREIGN PATENT DOCUMENTS

| 20 14 605 | 3/1970 | Germany . | |
| 26 18 046 | 4/1976 | Germany . | |
| 30 18 156 | 5/1980 | Germany . | |
| 36 02 551 | 1/1986 | Germany . | |
| 36 02 510 | 1/1986 | Germany . | |
| 2-28499 | 1/1990 | Japan | 187/285 |
| 2-169499 | 6/1990 | Japan | 187/285 |
| 3-3897 | 1/1991 | Japan | 187/275 |
| 3-67877 | 3/1991 | Japan | 187/285 |
| 4-39299 | 2/1992 | Japan | 187/285 |
| 4-179698 | 6/1992 | Japan | 187/275 |

OTHER PUBLICATIONS

Hong, IEEE Transactions on Industrial Electronics, vol. IE–34, #4, Nov. 1987, pp. 435–440.

*Primary Examiner*—Hoang Nguyen
*Attorney, Agent, or Firm*—Faegre & Benson

[57] ABSTRACT

A hydraulic lift apparatus for a battery driven lift truck includes a hydraulic lift cylinder. A hydraulic pump operates as a pump in a load raising mode, so as to feed pressure fluid to the lift cylinder. The hydraulic pump operates as a motor in a load lowering mode. The hydraulic pump is driven by the pressure fluid displaced by the lift cylinder. A direct current machine is coupled to the hydraulic pump, so as to operate as an electric motor in the load raising mode and to operate as a generator in the load lowering mode. A useful brake circuit is energized by the direct current machine in the load lowering mode. A valve assembly is disposed in the pressure fluid path between the lift cylinder and the hydraulic pump. Control apparatus are provided for controlling the valve assembly and including speed regulating apparatus for varying the speed of the direct current machine. At least one secondary hydraulic consumer is adapted to be connected to a hydraulic pressure source via an associated control valve. A lowering branch is provided between the valve assembly and a connection is provided between a check valve and the inlet of the hydraulic pump. The secondary hydraulic consumer receives fluid from the hydraulic pump via the valve assembly. There is provided an externally excited direct current machine having its speed controlled by the speed regulating apparatus in response to operation of the valve assembly.

9 Claims, 6 Drawing Sheets

HYDRAULIC LIFT APPARATUS FOR A BATTERY DRIVEN LIFT TRUCK

FIELD OF THE INVENTION

The present invention relates to a hydraulic lift apparatus for a battery driven lift truck or similar vehicle.

BACKGROUND OF THE INVENTION

In such hydraulic lift apparatuses, the pressure fluid source generally is comprised of a constant pump which is driven by an electric motor. The speed of the motor is controlled in response to the positions of a valve lever. This allows to change the raising speed without any substantial throttling losses during the raising of a load. It has become known to make the lowering speed also dependent on the positions of the valve lever; this is achieved by a way valve in the lowering branch. The potential energy of the load is converted into heat energy and the throttle of the way valve and is fed into the tank along with the hydraulic fluid. Furthermore it has become known to use the motor pump unit for performing the load holding function during the lowering operation and to refeed a portion of the potential energy of the load into the battery via the electric motor which operates as a generator in this situation.

From German 20 14 605, German 26 18 046, German 30 18 156, it has become known to set the lowering speed by means of hydraulic reservoirs or by means of throttles. As an alternative, the motor operates only in one operative mode. As a result, the electric motor has only a very limited operative range when it operates as a generator. From U.S. Pat. No. 3,947,744, it has become known to control the electric motor by a simple field control during the lowering operation, and it has become known from German 36 02 551 to use a series-wound motor, which operates in a limited operative range. The operative ranges which are not covered by the electric motor driven as a generator have to be covered by further hydraulic throttles; it is inherent that the potential energy of the load cannot be used in this case.

In lift trucks it is generally necessary to feed hydraulic pressure to additional consumers. It has become known to pressurize these hydraulic consumers also via the hydraulic pump by setting a constant speed value for performing the secondary functions, with a valve lever position responsive speed component being added to the constant speed value for performing the raising function. During the lowering operation, a hydraulic pump cannot operate as a generator and perform the secondary functions at the same time. Accordingly, it has become known from U.S. Pat. No. 3,947,744 to provide an additional motor pump unit for performing the secondary functions.

It is an object of the present invention to provide a hydraulic lift apparatus for a battery driven lift truck wherein the drive machine for the hydraulic pump is driven over the complete operative range required by the hydraulic system for raising and lowering the load, while no additional motor pump unit is required for performing the secondary functions.

The present invention and further developments of the invention are defined in the patent claims.

According to one aspect of the invention as defined in patent claim 1, an externally excited direct current machine is provided which, according to one embodiment of the invention, provides for controlling of the excitation and armature voltages independently of each other. To this end, there is provided a separate field current regulating means including a desired value generator which determines a desired value of the field current from predetermined relationships of the speed and the armature current power switches actuatable by said regulating means are associated with the field coil and the armature, the arrangement and operation of said power switches determining the amount and the direction of the current through the armature and the field coil, and control means comprises a directional means for the raising and lowering operations. Furthermore, it is of inventive importance that the lowering branch is provided between the valve assembly and a connection between a check valve and the inlet of the hydraulic pump, with the hydraulic pump pressurizing the secondary hydraulic consumer. As a result, the direct current machine is driven at all times in the same direction of rotation, no matter whether there is a raising or lowering operation. Accordingly, the hydraulic consumer can be operated directly by the hydraulic energy from the lowering operation, so that efficiency losses due to additional energy conversions are avoided.

The present invention allows for a load independent control of the lowering speed both when the direct current machine operates as a generator and when there is a controlling operation solely via the valve assembly. The load holding function can be realized by the manually actuatable control valve which is infinitely adjustable and accordingly allows for a very sensitive regulation of the raising and lowering speeds.

During the lowering operation, the normal case is that the secondary hydraulic consumer is operated by the hydraulic energy resulting from the lowering operation. The excess volume flow is refed into the tank. Furthermore, it is possible that, during the lowering operation, the pressure is greater than necessary for operating the secondary consumer, while only a too small volume flow is available. The speed control causes the electric motor to drive the pump.

In order to prevent that the lowering speed will become excessive, one embodiment of the invention provides a hydraulic volume flow limiter in the lowering branch, which limiter limits the volume flow from the hydraulic cylinder at the inlet to a value predetermined by the valve lever position. It may be comprised of a pressure balance which is controlled by the volume flow and the inlet pressure of the control valve assembly. This constellation ensures that the lowering speed is maintained to be substantially constant. As soon as the flow rate in the pressure balance exceeds a predetermined value relative to the valve lever position at the control valve, the pressure balance starts its controlling function. It operates in connection with the throttle of the control valve as a two-way flow regulator and accordingly maintains the said lowering speed at a constant value. In this manner, it is ensured that the hydraulic pump can draw fluid via the check valve. Preferably, in this mode the control is such as to obtain a constant speed of a value such that the volume stream fed by the pump is sufficient to accommodate the maximum volume flow demand of the additional consumer. A valve lever position responsive velocity or speed of the secondary consumer is adjusted via an additional control valve, with the excess volume flow being refed into the tank.

Finally, it is also possible that both the pressure and the volume flow during the lowering operation are smaller than required for the secondary function. In this case, an embodiment of the invention provides that a switch valve is connected between the pressure limiter and the hydraulic pump. The switch valve directs the hydraulic fluid directly to the tank when the pressure and volume flow in the lowering branch are smaller than necessary for operating the hydraulic consumer. The combination of the pressure balance and switch valve then works as a two-way flow rate regulator. The pressurizing of the secondary hydraulic consumer occurs in the same manner as already described.

The lift mast of a hydraulic lift truck includes among others a free lift cylinder and at least one mast lift cylinder. The oil volume of the free lift cylinder is discharged during the lowering operation only after the mast lift cylinder has been completely retracted and accordingly does not contain any oil. As a result thereof, there will be a transition between the lowering operation in the mast lift mode and in the free lift mode. Due to the different cylinder faces in the mast lift mode and free lift mode there will be different lowering speeds at the same generator speed. In order to compensate for this, a further embodiment of the invention provides for detecting whether the lift mast is in the mast lift range or in the free lift range, and in response thereto proportionality factors between the desired lowering speed value and the motor speed in the control are changed so as to obtain the same lowering speed both in the mast and free lift modes.

From "Microprocessor-based High-Efficiency Drive of a DC Motor" in IEEE Transactions on Industrial Electronics, vol. IE 34, No. 4 November 1987, pages 433 to 440, it has become known to control or regulate the armature and the field of a direct current machine so that the desired value for the field current is determined by predetermined relationships between the speed and the armature current, i.e. the actual armature current value. In this connection, a corresponding algorithm or a corresponding table is to be provided.

The control or the desired value generation for the lift apparatus is obtained by an electric signal, for example via a manually actuated potentiometer, with directional means providing signals indicating the operations raising or lowering, respectively. At the moment when the hydraulic fluid starts to flow in the lowering branch via the control valve assembly, the hydraulic pump drives the direct current machine which operates as a generator. Since, however, the desired value for the speed still equals zero, the control tries to obtain this value, whereby the associated power switch for the armature is completely fired. The power switches for the field coil are operated such that the current is at a maximum. From this results a maximum brake torque which is sufficient to lower the load at a minimum speed if this is desirable. By providing corresponding desired values for the speed on the other hand, the raising and lowering speeds can be adjusted to the desired value.

SUMMARY OF THE INVENTION

A preferred embodiment of the invention provides that the desired field current value generator determines the desired value for the field current from the desired armature current value and the actual speed. This provides for the advantage that the speed control may operate also in the operative range wherein a higher armature voltage than the battery voltage is necessary to lower the load at an optimum efficiency.

Instead of an externally excited direct current machine, it is possible to use a three-phase induction machine which is operated accordingly via converters. Speed control means determines by means of a speed sensor the actual rotor frequency of the machine in order to determine a control deviation from a desired speed value or a desired frequency value in order to obtain the desired speed both for the raising and lowering operations. Depending on whether the difference between the actual and desired frequency indicates a positive or negative slip, the three-phase induction machine operates as a motor or as a generator. Refeeding of electrical energy into the battery is obtained automatically without special provisions being required.

BRIEF DESCRIPTION OF THE DRAWINGS

With reference to accompanying drawings, the invention will be explained in more detail.

DETAILED DESCRIPTION OF THE INVENTION

Figure 1:
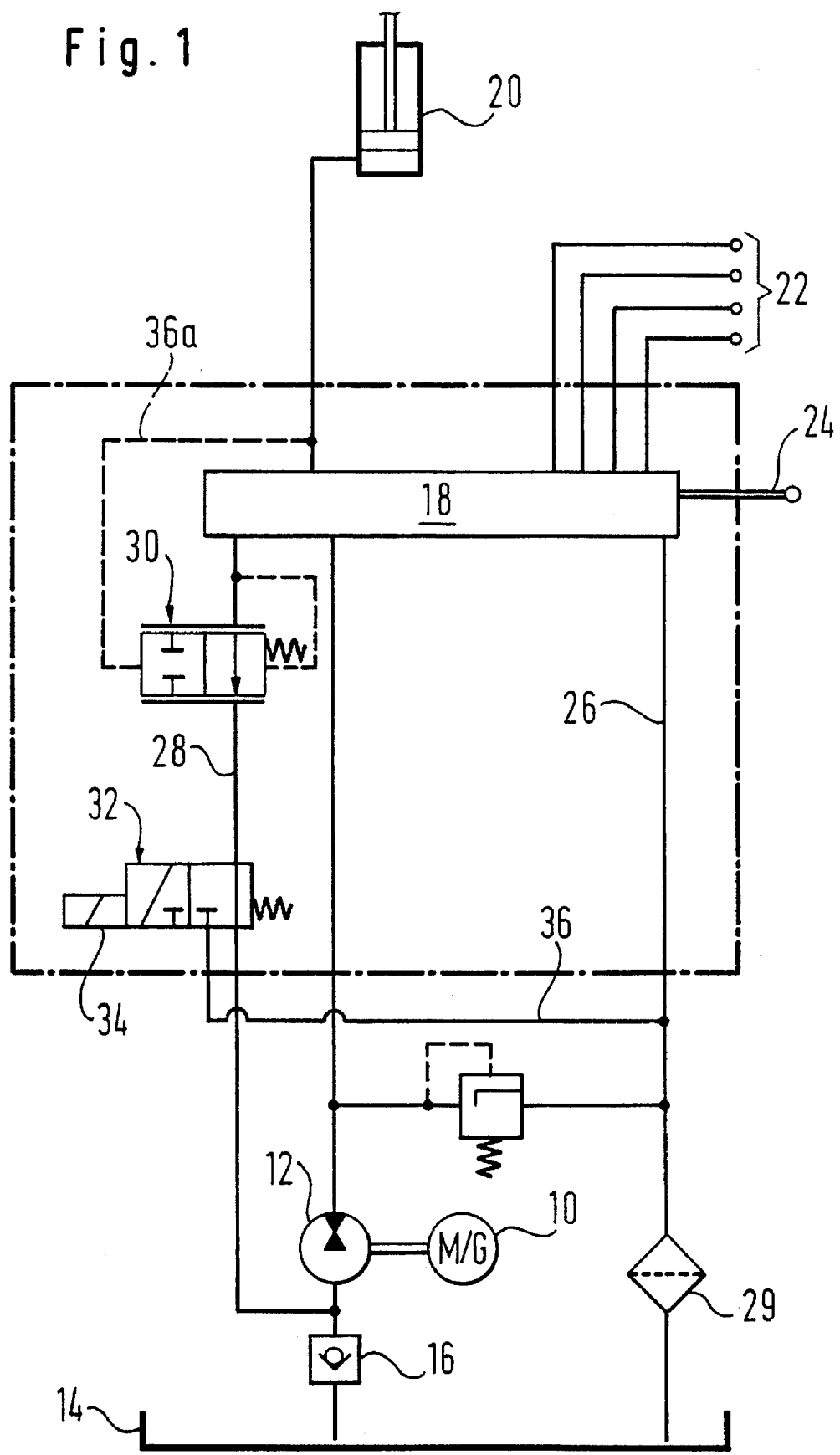
FIG. 1 shows a hydraulic lift apparatus in accordance with the invention.
Figure 2:
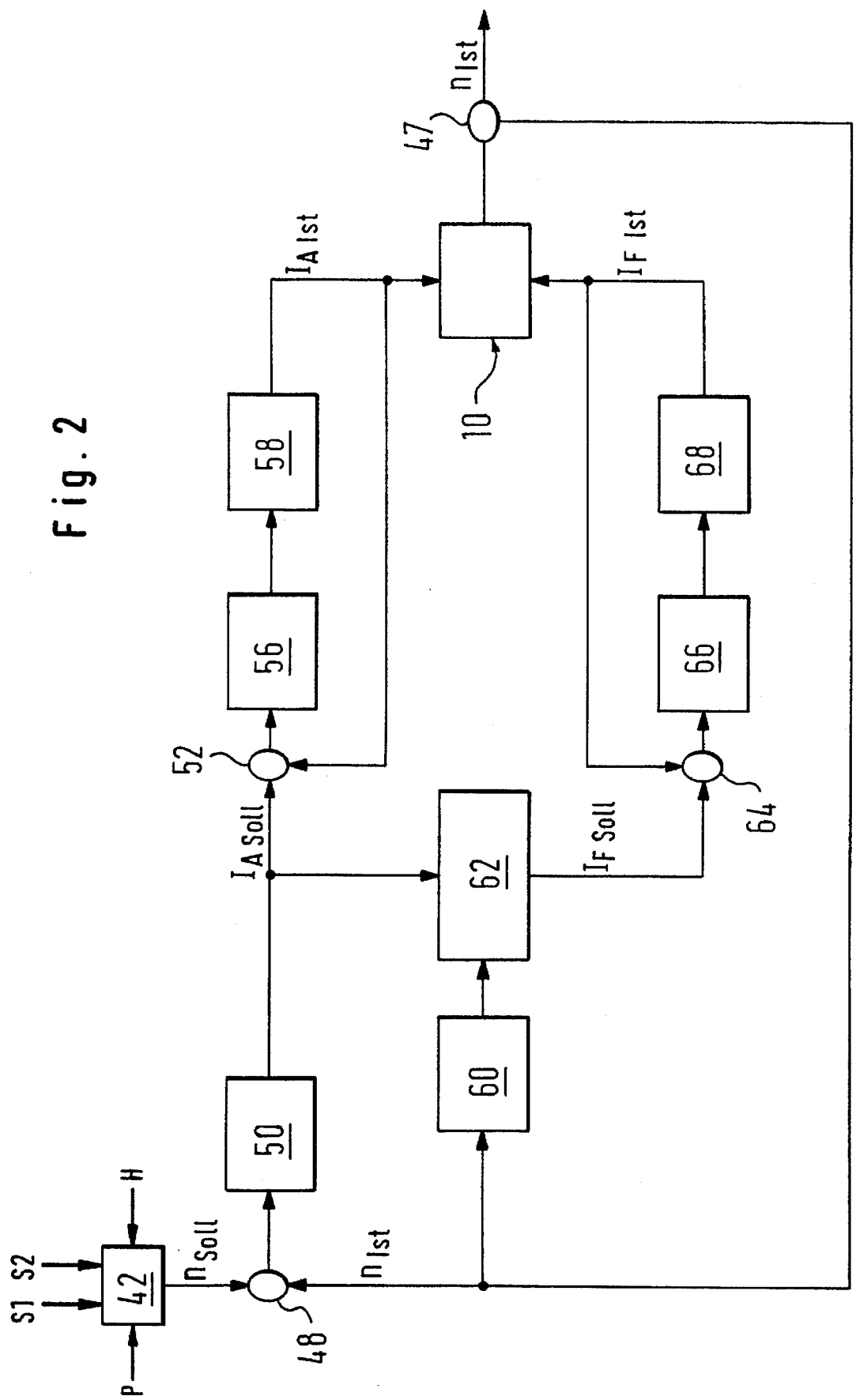
FIG. 2 shows a block diagram of the control of the lift apparatus in FIG. 1.

An externally excited direct current machine 10 drives a hydraulic pump 12 which selectively operates as a motor. The pump 12 draws hydraulic fluid via a check valve 16 from a tank 14 and feeds it, via a control valve assembly 18, to a lift cylinder 20 or a group of secondary functions 22. The valve assembly 18 is manually actuated. For actuating the lift cylinder 20, there is provided for example a manual lever 24. For actuating the secondary functions 22, there are provided additional (not shown) manual levers. A speed regulating means to be described later is set so that initially a constant speed of the direct current motor 10 is used to operate the secondary functions 22. Excess volume flow is refed into the tank 14 via a line 26 and a filter 29. Raising and lowering of the lift cylinder 20 is then performed in a speed responsive manner. The lowering operation is obtained by actuation of the manual lever 24; a lowering branch 28 of the control valve assembly 18 is connected to a location between the pump 12 and the check valve 16. The volume flow during the lowering operation drives the hydraulic pump 12 in the same direction as it is driven when it operates as a pump so that it operates as a hydraulic motor driving the direct current machine 10 which now operates as a generator in order to convert the potential energy from the lift cylinder into electrical energy used for loading the battery. The lowering branch 28 includes a hydraulic pressure balance 30 and a switch valve 32 which is in an open position when it is not actuated by its solenoid 34. When it is, however, actuated, it communicates the upper portion of the lowering branch 28 via a line 36 with the line 26 and the tank 14. The hydraulic balance 30 receives, via a control inlet, the pressure in the lowering branch between the lift cylinder 20 and the control valve 18 as indicated by the dotted line 36a. The hydraulic balance 30 receives the differential pressure which is present across the valve 18 and which is valve lever position responsive. When the differential pressure will exceed a predetermined value, the pressure balance performs its controlling function, and the load pressure is decreased across the valve 30 so that ambient pressure prevails at the pump 12 and fluid can be pumped from the tank. If the volume flow in the pressure balance 30 exceeds a value as determined by the manual valve 18, a limiting function will be obtained so that the volume flow is not abruptly increased when the valve 32 is switched; at this time the pump 12 can draw hydraulic fluid from the tank 14 if it is driven by the direct current machine 10.

The raising of the lift cylinder 20 as well as the operation of the secondary functions have already been described. Also, the lowering operation has been substantially explained. The valve lever position responsive control of the speed of the motor 10 is directly proportional to the lowering speed apart from negligible leakage losses of the pump 12. When during the lowering phase, there is a demand for a secondary function 22, the fluid is throttled in the control valve 18 to the pressure necessary for the secondary function. The secondary function is provided directly with the energy resulting from the lowering operation when the pressure and the volume flow are sufficient. This is normally the case when the load is lowered. A reversal of the pump 12 is not required. If the pressure and the volume flow resulting from the lowering operation are sufficient to operate the secondary function, there will be a direct hydraulic pressurization by the volume flow resulting from the lowering operation, with the excess volume flow being fed into the tank 14 via the control valve assembly 18.

As soon as there is demand for a secondary function, the control means compares the actual motor speed resulting from the lowering speed with the desired speed corresponding to the volume flow requirement of the secondary function. When the volume flow requirement of the secondary function exceeds the "offer" resulting from the lowering operation, the motor speed will be increased accordingly. For this constellation, it must be ensured that the lowering speed remains approximately constant. This is achieved, as already mentioned, by the pressure balance if 30 in cooperation with the variable throttle in the control valve assembly 18. As soon as the flow rate at the pressure balance 30 exceeds a predetermined value relative to the valve lever position at the valve 18, the pressure balance 30 starts to perform its controlling operation. It now operates in connection with the throttle in the valve 18 as a two-way flow rate regulator so as to maintain the set lowering speed at a constant value. As a result it is ensured that the pressure resulting from the lowering operation is decreased at the pressure balance 30 and that additional fluid is fed via the valve 18 to ensure the operation of the secondary function 22. The motor 10 is operated at a constant speed which is selected so that the volume flow fed by the pump 12 is sufficient to satisfy the maximum volume flow requirement of the secondary functions. A valve lever position responsive speed of the secondary functions is enabled by a lever actuated throttle in the control valve assembly 18. Excess volume flow is refed into the tank 14 via the filter 29.

If the pressure resulting from the lowering operation is smaller and the volume flow is smaller or greater than necessary for the secondary function, the switch valve 32 is switched off and the fluid is fed directly into the tank 14 via the filter 29. The lowering speed is maintained at a constant value via the pressure balance in connection with the throttle in the control valve assembly 18 which is adjustable by the valve lever. This combination operates similar to a two-way flow rate regulator. Operating the secondary function 22 is obtained via the direct current motor 10 and the hydraulic pump 12 as described above.

The speed control of the externally excited direct current machine 10 of the apparatus in FIG. 1 will now be explained in more detail with reference to FIGS. 2 to 7.

Figure 4:
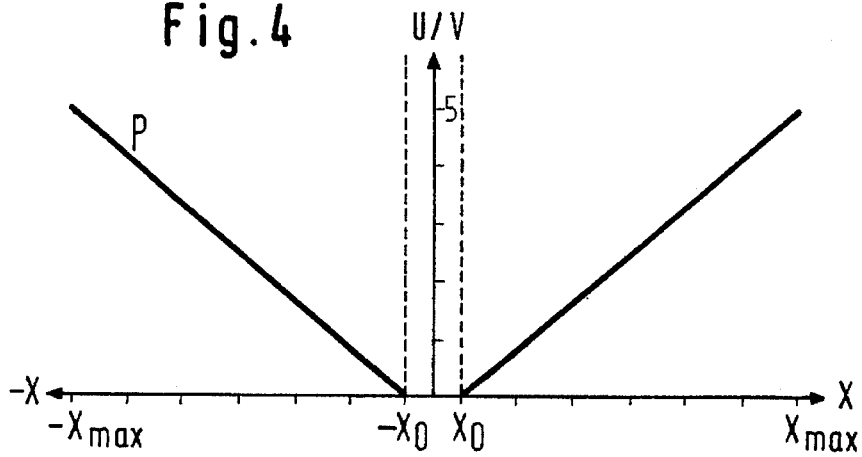
FIGS. 4 to 6 show diagrams of various control signals of the lift apparatus according to the invention.
Figure 5:
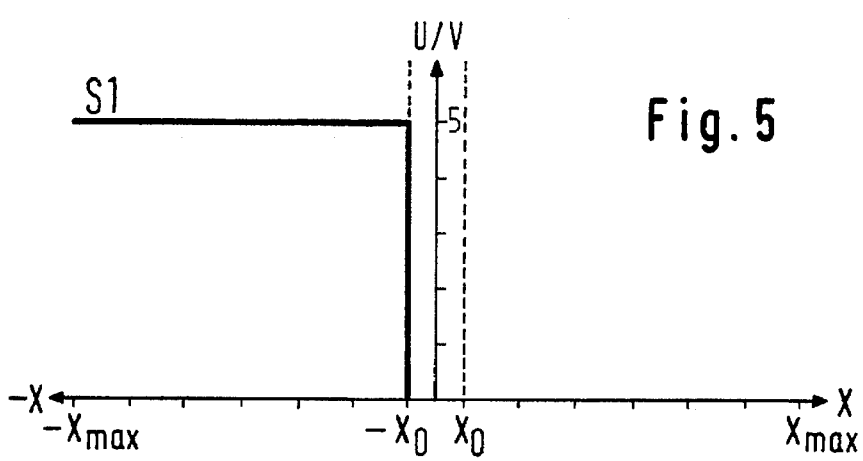
Figure 6:
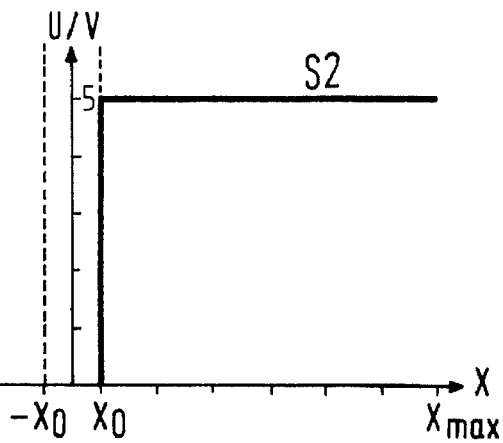
Figure 7:
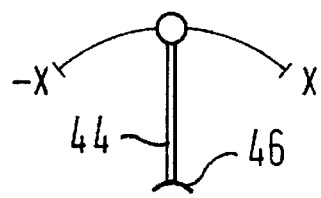
FIG. 7 shows manual actuating means for the lift apparatus in accordance with the invention.

FIG. 7 shows a manual lever 44 which is pivotal to the left and to the right, with the extent of pivotal movement being indicated by $-X$ and $+X$, respectively. It actuates a potentiometer indicated at 46 and generating a signal P in response to the pivotal movement. The signal P is represented in FIG. 4. The pivotal movement responsive signals in FIG. 4 do not differ from each other as to their polarity; this is why a pair of microswitches (not shown) is associated with the lever 44, which microswitches determine the polarity of the signal P. This is indicated by the signals S1 and S2 in FIG. 5 and FIG. 6, respectively. A desired speed value generator 42 computes a desired speed value $n_{Soll}$ from the signals P, S1 and S2, with the absolute value of P determining the absolute value of $n_{Soll}$ and the signals S1 and S2 determining the corresponding polarities. If a signal is received from the generator 42, the desired speed value is modified correspondingly so as to maintain a constant lowering speed (this will be explained in more detail below). A speed sensor 47 connected to the direct current machine provides an actual speed value $n_{Ist}$ to a desired/actual values comparator 48, and the control deviation is fed to a speed regulator 50. It provides a desired value for the armature current $I_{ASoll}$ which is compared with the actual armature current value $I_{AIst}$ in a desired/actual values comparator 52. The control deviation is fed to an armature current regulator 56 and from there to an actuator indicated at 58.

A table 60 stores relationships between the speed and the armature current. In a respective computing stage 62, the desired value for the field coil current $I_{FSoll}$ is computed from the data of the table 60. In this connection, it is important that the desired armature current value $I_{ASoll}$ is used for the computation. The desired value $I_{FSoll}$ is compared to the actual field current value in an actual/desired values comparator 64, and the control deviation is fed to a field current regulator 66 which provides a corresponding positioning signal in the position signal generator 68. The controllers 56, 66 are digital controllers and generate, via following power components 58, 68, pulse width modulated voltages which are used to adjust the predetermined current values $I_{ASoll}$ and $I_{FSoll}$. Due to the fact that the desired armature current value $I_{ASoll}$ in addition to the actual speed value $n_{Ist}$ is used as an input for computing the desired field current value $I_{FSoll}$, it is possible to operate in an operative range wherein an armature voltage exceeding the battery voltage $U_{Batt}$ would be necessary to perform a lowering operation in a generator-type manner at optimal efficiency as will be described later on.

Figure 3:
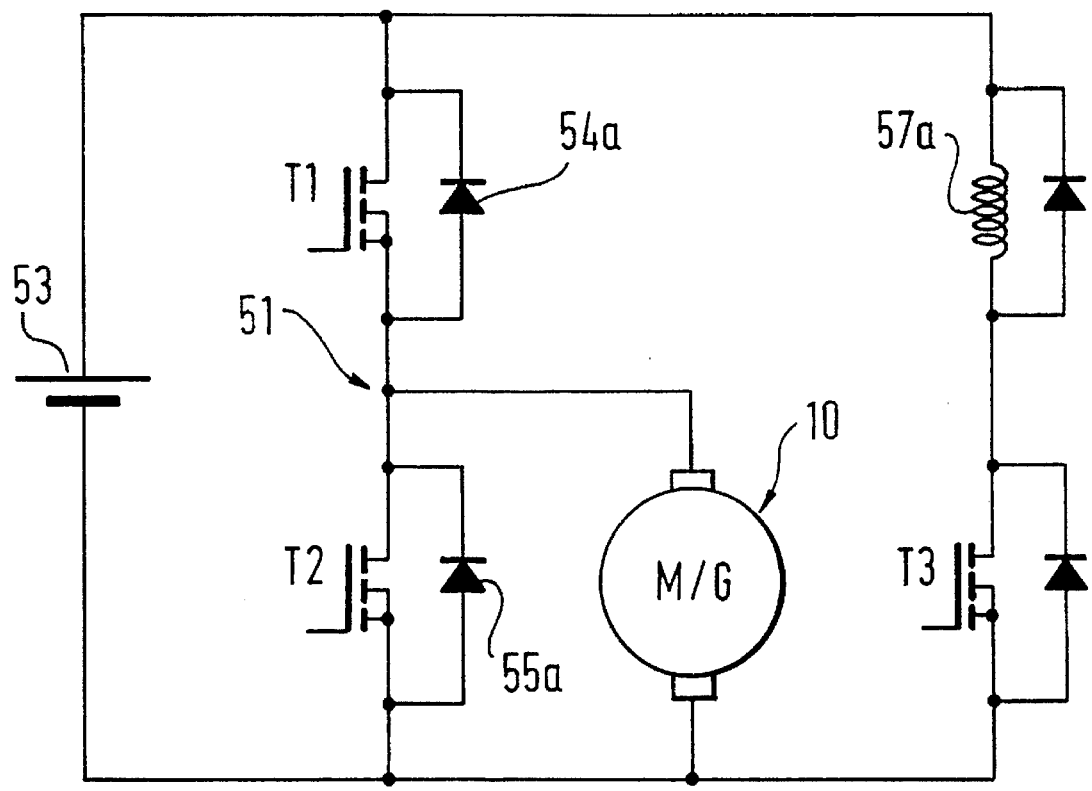
FIG. 3, shows a block diagram of the active components of the direct current machine in FIGS. 1 and 2.

As may be seen from FIG. 3 the armature of the externally excited direct current machine 10 is connected to a battery 53 via a semibridge 51 consisting of the MOSFETs T1 and T2. Diodes 54a, 55a are connected in an antiparallel relationship to the MOSFETs T1 and T2. The field coil 57a is connected to the poles of the battery 53 in series connection to the MOSFET T3 and in parallel connection to the semibridge 51, a diode being connected in an antiparallel relationship to the field coil 57a and to the MOSFET T3, respectively.

The MOSFETs T1 and T2 are operated in a cyclic manner, i.e. the MOSFET T1 is switched off when MOSFET T2 is switched on, and vice versa. The amount of the current flow, accordingly, results from the duty cycle of the pulses for the MOSFETs T1 and T2. The same is true for the MOSFET T3. The MOSFET T1 operates during the motor-type lift operation as a so-called low setting means, and the MOSFET T2 operates during the generator-type lowering operation as a high setting means.

When the lever 44 is pivoted from its rest position in a direction for a lowering operation so far that the demand for the lowering function is provided via the signal S2 while the signal P indicates a desired speed value $n_{Soll}=0$, the signal S2 causes the valve 18 to open; as a result hydraulic fluid flows through the pump 12 and drives the direct current machine 10. Due to the control deviation resulting therefrom, an $I_{ASoll}$ is fed to the desired/actual values comparator 52, and the armature current regulator 56 causes the armature to be short circuited via the MOSFET T2. Furthermore the field coil 57a receives a maximum field current. The resulting speed value is so small that the resulting minimal lowering speed is sufficient to ensure a sensitive lowering of the lift cylinder 20. At this point of operation of the direct current machine 10 no energy is refed into the battery 53.

If, however, a desired speed value $n_{Soll}>0$ is set by a further pivotal movement of the valve lever, the regulator 56 reduces the pulse width of the MOSFET T2 relative to the 100% operation until the desired speed $n_{Soll}$ will result. The MOSFET T2 now operates at each pulse width<100% in the high setting mode, and energy will be refed into the battery 53.

Figure 8:
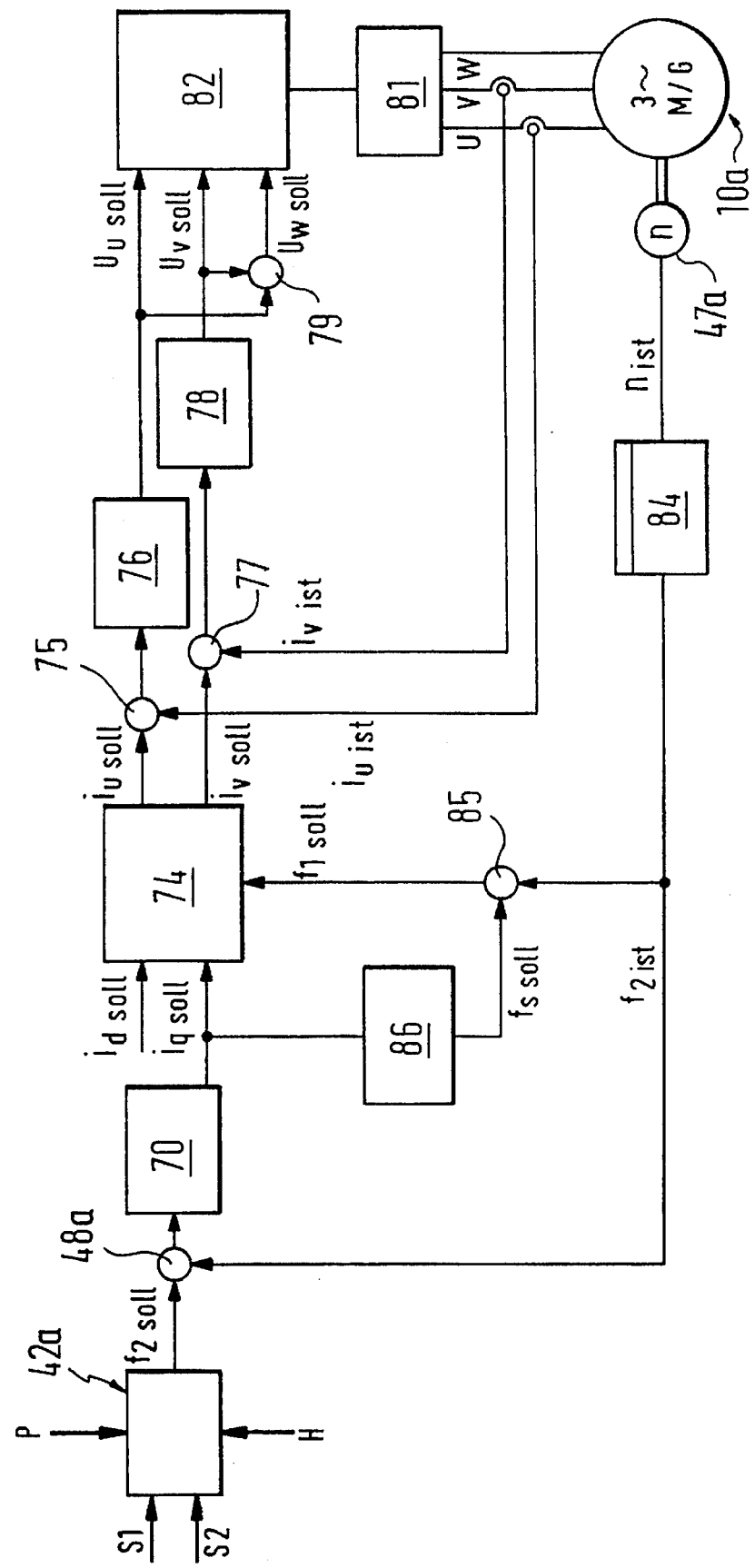
FIG. 8 shows a block diagram of the control of a lift apparatus similar to that in FIG. 1, which, however, includes a three-phase induction machine.

In FIG. 8 a desired speed value generator 42a generates from the signals P, S1 and S2 a desired rotor frequency value $f_{2Soll}$ for a threephase induction machine 10a which can be used instead of the externally excited direct current machine of FIG. 1 in the circuit shown therein. The signal P fed into the desired value generator 42a corresponds to the extent of the pivotal movement of for example the manual lever in FIG. 7. The polarity of the signal is determined by microswitches (not shown) which are associated to the manual lever 44. Accordingly, the polarity is determined by the signals S1 and S2. A speed sensor 47a connected to the machine 10a provides an actual speed value $n_{ist}$ which is fed to a computing stage 84 which computes the actual value $f_{2ist}$ of the rotor frequency in accordance with the pole pair p of the machine 10a. The actual frequency value is fed to the desired/actual values comparator 48a, and the deviation is fed to a speed regulator 70.

The speed regulator 70 generates a desired value for the active component $i_{qsoll}$ of the complex current space pointer i. The active component $i_{qsoll}$ is proportional to the torque of the induction machine 10a. The value $i_{dsoll}$ is the desired value of the reactive component of the current space pointer i which is proportional to the magnetizing current of the induction machine. The desired value for the slip frequency $f_{ssoll}$ at 86 is determined from the desired value of the active component $i_{qsoll}$ of the current space pointer i. 86 may include a table which interconnects the active current and the slip frequency. As an alternative, a replacement circuit diagram of the induction machine can be included in 86 and may be used to determine the respective slip frequency relatively precisely.

The obtained slip frequency $f_{ssoll}$ will be added to the actual rotor frequency value $f_{2ist}$ at 85. The result is the desired stator frequency value $f_{Isoll}$ which is fed to a rotary transformation means 74. The current space pointer i resulting from $i_{qsoll}$, $i_{dsoll}$ and $f_{Isoll}$ is transformed into the phase parameters from which the desired values for the phase currents $i_{usoll}$ and $i_{vsoll}$ follow. The respective deviations which are obtained by subtracting the respective actual current values $i_{uist}$ and $i_{vist}$ at the adding stages 75 and 77 are fed to the current regulators 76 and 78 which provide the values for the phase voltages $U_{usoll}$ and $U_{vsoll}$. The desired value of the third phase voltage $U_{wsoll}$ can be computed at the adding stage 79 from the condition that the sum of all three voltages must equal zero.

The three voltage values are converted, in block 82, into pulse width modulated signals which energize a power output stage 81 such that the desired current values in the induction machine 10a result.

Figure 9:
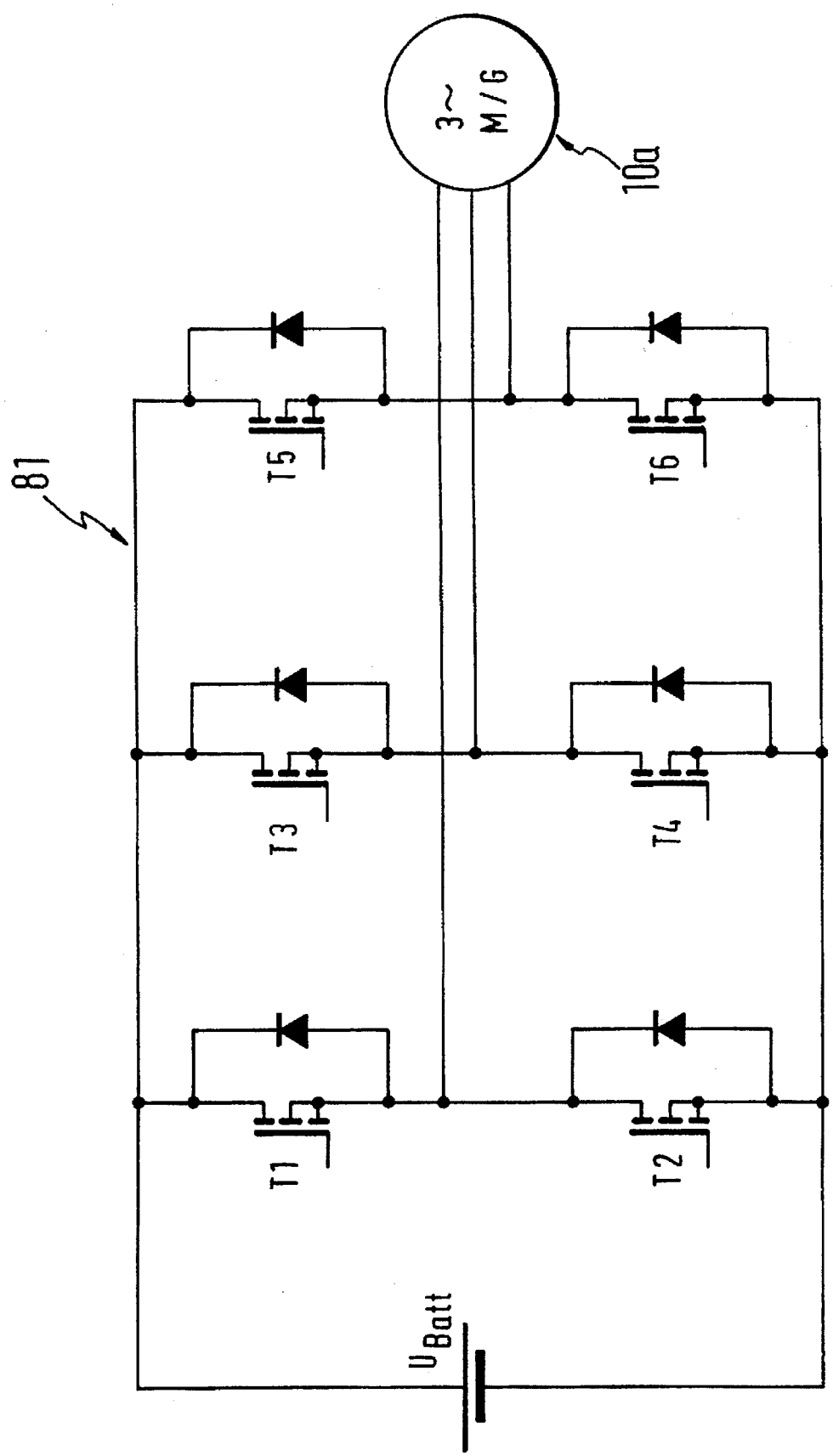
FIG. 9 shows a block diagram of the active component of the induction machine in FIG. 8.

Details of the power output stage 81 are shown in the block diagram of FIG. 9.

As shown in FIG. 9, each phase of the induction machine 10a is connected to a connection point of a pair of MOSFETs T1 to T6, respectively, which are connected in series and subjected to the battery voltage $U_{Batt}$. The transistors T1 to T6 are operated at a sinusoidal pulse width and are energized pairwise in an anticyclic manner. Energization of the three transistor pairs is designed so that the sinusoidal pulse width modulated drive signals are fed to the transistor pairs out of phase each for 120° at the frequency of the sinusoidal evaluation. Under these circumstances a rotating field which is variable as to frequency and voltage is generated in the induction machine 10a.

A comparison of the frequency $f_{ssoll}$ and $f_{2ist}$ provides the polarity of the desired frequency $f_{ssoll}$ from which follows whether the induction machine 10a is to be operated as a motor or as a generator. As a result energy is automatically— without any further measures—refed into the battery in FIG. 9 when the induction machine 10a is operated as a generator.

When the lever 44 in FIG. 7 is pivoted from its rest position in the direction for a lowering operation so far that the demand for the lowering function is generated via the signal $S_2$ and on the other side the signal P indicates a desired rotor frequency value $f_2$=zero, hydraulic fluid flows to the hydraulic system and drives the induction machine 10a. The control means now performs a control operation such as to arrive at the lower control limit, i.e. the minimum stator field frequency which is about 0.2 Hz. The slip in the induction machine 10a provides for results a continuous control deviation. The resulting speed value is so small that the resulting minimum lowering speed is sufficient to ensure a sensitive lowering of the lift cylinder 20 (FIG. 1).

The lift apparatus in accordance with the present invention can comprise a lift mast having at least one displaceable mast portion and load receiving means mounted on the displaceable mast portion so as to be adjustable in height. A sensor can also be provided on the lift mast for detecting whether there is a lowering operation of the displaceable mast portion or of the load receiving means. Such a sensor can provide signals H (see FIGS. 2 and 8) to the desired speed value generator 42 for modifying a desired speed value signal ($n_{Soll}$).

What is claimed is:

1. A hydraulic lift apparatus for a battery driven lift truck including:

a hydraulic lift cylinder, a hydraulic pump, which operates as a pump in a load raising mode, so as to feed pressure fluid to said lift cylinder, and which operates as a motor in a load lowering mode and is driven by the pressure fluid displaced by the lift cylinder, a direct current machine coupled to the hydraulic pump, so as to operate as an electric motor in the load raising mode and to operate as a generator in the load lowering mode, a useful brake circuit energized by said direct current machine in the load lowering mode, a valve assembly disposed in a pressure fluid path between said lift cylinder and said hydraulic pump, control means for controlling the valve assembly and including speed regulating means for varying speed of said direct current machine, and at least one secondary hydraulic consumer adapted to be connected to a hydraulic pressure source via the valve assembly, characterized in that a lowering branch (28) is provided between said valve assembly (18) and a connection between a check valve (16) and an inlet of said hydraulic pump (12), that the secondary hydraulic consumer (22) receives fluid from said hydraulic pump (12) via said valve assembly (18), that the direct current machine is an externally excited direct current machine (10) having its speed controlled by said speed regulating means in response to operation of said valve assembly (18), and that a hydraulic pressure limiter (30) is disposed in said lowering branch (28), a decrease of total hydraulic pressure being experienced at said pressure limiter under certain operational conditions, such that the hydraulic pressure limiter (30) performs a load holding function.

2. A lift apparatus according to claim 1, wherein said pressure limiter comprises a pressure balance (30) controlled by volume flow and differential pressure of the valve assembly (18).

3. A lift apparatus according to claim 2, wherein a switch valve (32) is disposed in said lowering branch (28) between said pressure limiter (30) and said hydraulic pump (12), which switch valve, when in one operative position, communicates said lowering branch (28) with a sump (14) of said hydraulic pump (12), when pressure or volume flow in said lowering branch is smaller than required for operation of said secondary hydraulic consumer (22).

4. A lift apparatus according to claim 1, wherein there is provided a separate field current regulating means (66, 68), including a desired value generator (62), which determines a desired value of field current ($I_{FSoll}$) from predetermined relationships of speed ($n_{1st}$) and armature current ($I_{ASoll}$), power switches (T1 to T3) actuatable by said regulating means are associated with a field coil (57a) and an armature, arrangement and operation of said power switches determining an amount and direction of current through the armature and the field coil, and said control means comprises a directional means (44, 46) for raising and lowering operations.

5. A lift apparatus according to claim 4, wherein said desired speed value generator for the speed regulating means comprises a potentiometer (46) having a positioning element (44), microswitches being associated with said positioning element, so as to generate directional signals (S1, S2).

6. A lift apparatus according to claim 4, wherein said desired field current value generator (62) determines a desired value of field current ($I_{FSoll}$) from a desired armature current value ($I_{ASoll}$) and actual speed ($n_{1st}$).

7. A lift apparatus according to claim 4, wherein the armature is connected to the battery (53) via a semi-bridge (51) of MOSFETs (T1, T2), diodes (54a, 55a) being connected in an antiparallel relationship to said MOSFETs (T1, T2) and said MOSFETs (T1, T2) are operated in a cyclic manner.

8. A hydraulic lift apparatus for a battery driven lift truck including:

a hydraulic lift cylinder, a hydraulic pump which operates as a pump in a load raising mode, so as to feed pressure fluid to said lift cylinder and which operates as a motor in a load lowering mode and is driven by the pressure fluid displaced by the lift cylinder, a direct current machine coupled to the hydraulic pump, so as to operate as an electric motor in the load raising mode and to operate as a generator in the load lowering mode, a useful brake circuit energized by said direct current machine in the load lowering mode, a valve assembly disposed in a pressure fluid path between said lift cylinder and said hydraulic pump, control means for controlling the valve assembly and including speed regulating means for varying speed of said direct current machine, and at least one secondary hydraulic consumer adapted to be connected to a hydraulic pressure source via the valve assembly, characterized in that a lowering branch (28) is provided between said valve assembly (18) and a connection between a check valve (16) and an inlet of said hydraulic pump (12), and that the secondary hydraulic consumer (22) receives fluid from said hydraulic pump (12) via said valve assembly (18), and the direct current machine is a three-phase induction machine driven via a frequency converter and includes a speed regulating means for controlling stator frequency in response to a deviation between actual speed value and a predetermined desired speed value, and the control means includes directional means for the raising and lowering operations.

9. A lift apparatus according to claim 8, including;

a lift mast having at least one displaceable mast portion and load receiving means mounted on said displaceable mast portion, so as to be adjustable in height, and a sensor provided on said lift mast, so as to detect whether there is a lowering operation of said displaceable mast portion or a lowering operation of said load receiving means, and providing signals to said desired speed value generator (47) for modifying a desired speed value signal ($n_{Soll}$).

* * * * *